(12) United States Patent
Overhultz, Jr. et al.

(10) Patent No.: US 10,826,929 B2
(45) Date of Patent: Nov. 3, 2020

(54) EXTERIOR DATA DEPLOYMENT SYSTEM USING HASH GENERATION AND CONFIRMATION TRIGGERING

(71) Applicant: BANK OF AMERICA CORPORATION, Charlotte, NC (US)

(72) Inventors: William R. Overhultz, Jr., Lancaster, SC (US); Michael Jacob Richardson, Chicago, IL (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 234 days.

(21) Appl. No.: 15/829,526

(22) Filed: Dec. 1, 2017

(65) Prior Publication Data

US 2019/0173906 A1 Jun. 6, 2019

(51) Int. Cl.
H04L 29/06 (2006.01)

(52) U.S. Cl.
CPC ...... H04L 63/1433 (2013.01); H04L 63/0227 (2013.01); H04L 63/04 (2013.01)

(58) Field of Classification Search
CPC .. H04L 63/1433; H04L 63/0227; H04L 63/04
See application file for complete search history.

(56) References Cited

U.S. PATENT DOCUMENTS

| | | |
|---|---|---|
| 6,418,436 B1 | 7/2002 | Degen et al. |
| 6,516,056 B1 | 2/2003 | Justice et al. |
| 7,181,017 B1 | 2/2007 | Nagel et al. |
| 7,451,488 B2 | 11/2008 | Cooper et al. |
| 7,480,631 B1 | 1/2009 | Merced et al. |
| 7,587,366 B2 | 9/2009 | Grim, III et al. |
| 7,873,732 B2 | 1/2011 | Chen et al. |
| 8,020,210 B2 | 9/2011 | Tippett et al. |
| 8,370,936 B2 | 2/2013 | Zuk et al. |
| 8,392,431 B1 | 3/2013 | Agassy et al. |
| 8,418,249 B1 | 4/2013 | Nucci et al. |
| 8,458,069 B2 | 6/2013 | Adjaoute |
| 8,606,712 B2 | 12/2013 | Choudhuri et al. |
| 8,635,695 B2 | 1/2014 | Zuk et al. |
| 8,666,841 B1 | 3/2014 | Claridge et al. |
| 8,676,684 B2 | 3/2014 | Newman et al. |
| 8,725,597 B2 | 5/2014 | Mauseth et al. |
| 8,744,894 B2 | 6/2014 | Christiansen et al. |
| 8,752,170 B1 | 6/2014 | Newstadt et al. |
| 8,776,180 B2 | 7/2014 | Kumar et al. |

(Continued)

*Primary Examiner* — Kristine L Kincaid
*Assistant Examiner* — Alexander R Lapian
(74) *Attorney, Agent, or Firm* — Michael A. Springs; Moore & Van Allen PLLC; Nicholas C. Russell (57) ABSTRACT

Embodiments of the invention are directed to systems, methods, and computer program products for vulnerability assessment and hash generation for exterior data deployment. In this way, the system utilizes a vulnerability assessment to generate a permit to send approval for dissemination of data, files, or the like outside of the entity via an electronic communication. The vulnerability assessment determines a permit to send status for the communication. The system may then generate a hash for the communication and embed the hash within the data of the communication. Upon sending, the entity will only permit communications with a known hash embedded therein from being transmitted outside of the internal entity network.

17 Claims, 6 Drawing Sheets

(56) References Cited

U.S. PATENT DOCUMENTS

| | | |
|---|---|---|
| 8,903,859 B2 | 12/2014 | Zeppenfeld et al. |
| 8,931,058 B2 | 1/2015 | DiChiara et al. |
| 9,027,125 B2 | 5/2015 | Kumar et al. |
| 9,118,702 B2 | 8/2015 | MaCaulay |
| 9,130,937 B1* | 9/2015 | Ostermann ......... H04L 63/0227 |
| 9,230,066 B1 | 1/2016 | Bailey et al. |
| 9,230,280 B1 | 1/2016 | Maag et al. |
| 9,275,291 B2 | 3/2016 | Shulman et al. |
| 9,282,092 B1 | 3/2016 | Shankar et al. |
| 9,319,419 B2 | 4/2016 | Sprague et al. |
| 9,438,615 B2 | 9/2016 | Gladstone et al. |
| 9,578,043 B2 | 2/2017 | Mawji et al. |
| 9,635,034 B2 | 4/2017 | Jamison et al. |
| 9,674,211 B2 | 6/2017 | Curcic et al. |
| 9,679,254 B1 | 6/2017 | Mawji et al. |
| 9,680,861 B2 | 6/2017 | Ward et al. |
| 9,699,209 B2 | 7/2017 | Ng et al. |
| 9,721,296 B1 | 8/2017 | Chrapko |
| 9,722,895 B1 | 8/2017 | Sarukkai et al. |
| 10,491,627 B1 | 11/2019 | Su |
| 2004/0044912 A1 | 3/2004 | Connary et al. |
| 2008/0222706 A1 | 9/2008 | Renaud et al. |
| 2009/0024663 A1 | 1/2009 | McGovern |
| 2009/0123023 A1 | 5/2009 | Hein |
| 2009/0178139 A1 | 7/2009 | Stute et al. |
| 2009/0328186 A1* | 12/2009 | Pollutro ............. H04L 63/0838 726/13 |
| 2012/0110174 A1 | 5/2012 | Wootton et al. |
| 2013/0104236 A1 | 4/2013 | Ray et al. |
| 2013/0179761 A1 | 7/2013 | Cho et al. |
| 2013/0318580 A1 | 11/2013 | Gudlavenkatasiva et al. |
| 2014/0201836 A1 | 7/2014 | Amsler |
| 2014/0259130 A1 | 9/2014 | Li et al. |
| 2014/0357318 A1 | 12/2014 | Li |
| 2015/0073876 A1 | 3/2015 | Pieper et al. |
| 2015/0135325 A1 | 5/2015 | Stevens et al. |
| 2015/0242619 A1 | 8/2015 | Bender et al. |
| 2015/0264077 A1 | 9/2015 | Berger et al. |
| 2016/0080399 A1 | 3/2016 | Harris et al. |
| 2016/0099963 A1 | 4/2016 | Mahaffey et al. |
| 2016/0173509 A1 | 6/2016 | Ray et al. |
| 2016/0173524 A1 | 6/2016 | Lietz et al. |
| 2016/0330219 A1 | 11/2016 | Hasan |
| 2016/0371617 A1 | 12/2016 | Mullaney et al. |
| 2016/0371698 A1 | 12/2016 | Adler et al. |
| 2016/0373419 A1 | 12/2016 | Weigold et al. |
| 2016/0381560 A1 | 12/2016 | Margaliot |
| 2017/0005803 A1 | 1/2017 | Brownewell et al. |
| 2017/0061129 A1 | 3/2017 | Bektchiev et al. |
| 2017/0063888 A1 | 3/2017 | Muddu et al. |
| 2017/0140312 A1 | 5/2017 | Pai et al. |
| 2017/0223032 A1 | 8/2017 | El-Moussa et al. |
| 2017/0244740 A1 | 8/2017 | Mahabir et al. |
| 2017/0251013 A1 | 8/2017 | Kirti et al. |
| 2017/0272472 A1 | 9/2017 | Adhar |
| 2017/0310708 A1* | 10/2017 | Schiappa ............ H04L 63/1408 |
| 2017/0324768 A1 | 11/2017 | Crabtree et al. |
| 2017/0339172 A1 | 11/2017 | Mahadevia et al. |
| 2017/0346846 A1 | 11/2017 | Findlay |
| 2017/0359370 A1 | 12/2017 | Humphries et al. |
| 2018/0034856 A1 | 2/2018 | Mallya |
| 2018/0084000 A1 | 3/2018 | Baukes et al. |
| 2018/0089449 A1* | 3/2018 | Boudreau ............... G06F 21/62 |
| 2018/0103055 A1* | 4/2018 | Keohane ............ H04L 63/1433 |
| 2018/0375877 A1* | 12/2018 | Jakobsson et al. ... H04L 63/126 726/3 |
| 2019/0066042 A1 | 2/2019 | Conlon |
| 2019/0081983 A1 | 3/2019 | Teal |
| 2019/0166154 A1 | 5/2019 | Steele et al. |
| 2019/0173909 A1 | 6/2019 | Mixer et al. |
| 2019/0260794 A1 | 8/2019 | Woodford et al. |

* cited by examiner

EXTERIOR DATA DEPLOYMENT SYSTEM USING HASH GENERATION AND CONFIRMATION TRIGGERING

BACKGROUND

In the information security context, individuals and entities may commonly rely on transmission of information and data across to external systems and applications. As a result, security issues and vulnerabilities may be possible with the transmission of information and data. Accordingly, there is a need for a way to efficiently and effectively monitor potential transmission vulnerabilities.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention processes and permits to send information, such as data, files, metadata, or the like from users, applications, or the like within the entity to an external party. In this way, the system runs a vulnerability process and evaluates the security of the information prior to it being distributed outside the entity network. Upon vulnerability processing and evaluation the system triggers the information as permit to send. The system generates and deploys a hash at the end of the vulnerability processing that is embedded into the information prior to leaving the entity network or server system. The hash is then confirmed within the information in order to allow the transmission of the information outside the entity.

The system may utilize the hash to track data, metadata, files, or the like that is distributed to an external source, when it was distributed to an external source, and the like. In this way, the system may be able to provide analytics as to the distribution of information and track the specific information that may have been provided to one or more external sources in case of a breach to the external source.

Embodiments of the invention relate to systems, methods, and computer program products for external communication deployment, the invention comprising: generating vulnerability processing with evaluation standards for individual users across an entity for external communication deployment; identifying a communication generated by the user within the entity, wherein the communication has an external party as recipient of the communication; applying the vulnerability processing to the communication after completion of the communication prior to communication deployment to the recipient; generating a permit to send signal for the communication based on an approved vulnerably processing; embedding a hash within the communication based on receiving the permit to send signal; and allowing, based on recognition of the hash, the communication to be transmitted outside the entity to the external party.

In some embodiments, the invention further comprises generating a no permit to send signal based on the vulnerably processing identifying one or more vulnerabilities. In some embodiments, the invention further comprises identifying information within the communication that triggers the no permit to send signal, wherein the information is highlighted within the communication and represented to the user for modification.

In some embodiments, the evaluation standards for individual users across an entity for external communication deployment comprise reviewing the communication for one or more proprietary information of the entity, customer information of the entity, security information of the entity, financial information of the entity or customers, and/or confidential information of the entity or customers for vulnerabilities to the entity.

In some embodiments, the evaluation standards for individual users across an entity for external communication deployment are user specific evaluation standards based on the user position within the entity.

In some embodiments, applying the vulnerability processing to the communication after completion of the communication prior to communication deployment to the recipient further comprises calculating the evaluation standards identified within the communication or attachments and generating a level for the communication based on a position of the communication within a vulnerability continuum, wherein the position of the communication within the vulnerability continuum is based on a number of vulnerabilities identified by the calculation.

In some embodiments, the communication generated by the user is an electronic communication and is identified based on being generated within a network associated with the entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" may be a financial institution, business, or the like that may have associates that may desire to transmit information outside the entity. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user that includes only personal information associated with the user, or the like. The account is associated with and/or maintained by the entity. In other embodiments, an entity may not be a financial institution. In still other embodiments, the entity may be the merchant itself.

For the purposes of this invention, a "communication" or a "user communication" may be any digital or electronic transmission of data, metadata, files, or the like. The communication may be originated by an individual, application, system within an entity. Furthermore, an "external party" may be one or more individuals, entities, systems, servers, or the like external to the entity. This may include third parties, partners, subsidiaries, or the like of the entity.

The invention processes and permits to send information, such as data, files, metadata, or the like. In this way, the system runs a vulnerability process and evaluates the security of the information prior to it being distributed outside the entity network. Upon vulnerability processing and evaluation the system triggers the information as permit to send. The system generates and deploys a hash at the end of the vulnerability processing that is embedded into the information prior to leaving the entity network or server system. The hash is then confirmed within the information in order to allow the transmission of the information outside the entity.

The system may utilize the hash to track data, metadata, files, or the like that is distributed to an external source, when it was distributed to an external source, and the like. In this way, the system may be able to provide analytics as to the distribution of information and track the specific information that may have been provided to one or more external sources in case of a breach to the external source.

Figure 1:
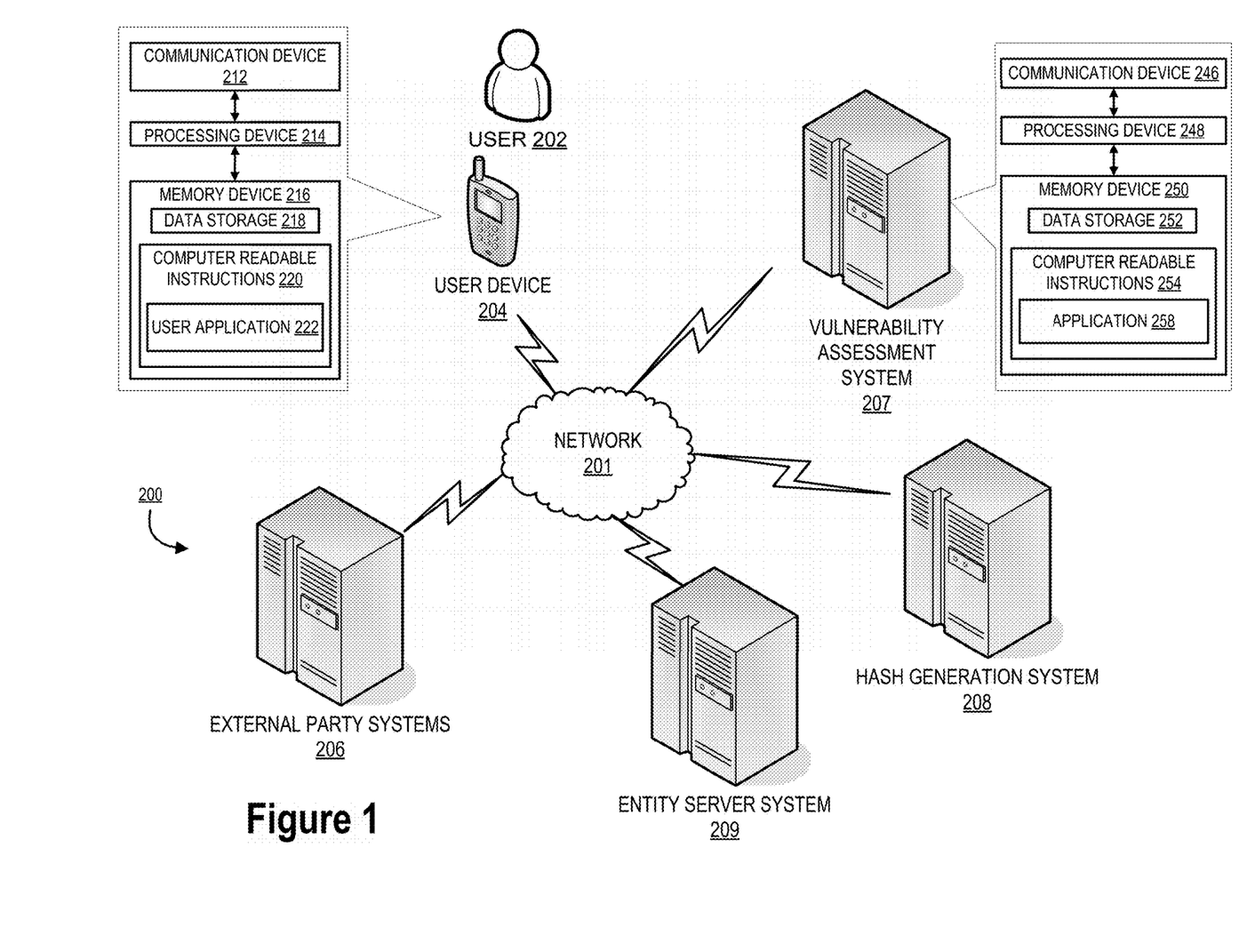
FIG. 1 illustrates an external data deployment confirmation system environment, in accordance with embodiments of the present invention.

FIG. 1 illustrates an external data deployment confirmation system environment 200, in accordance with embodiments of the present invention. FIG. 1 provides the system environment 200 for which the distributive network system with specialized data feeds for extract information for information security vulnerability assessments for the user. FIG. 1 provides a unique system that includes specialized servers and system communicably linked across a distributive network of nodes required to perform the functions vulnerability assessments for users As illustrated in FIG. 1, the hash generation system 208 is operatively coupled, via a network 201 to the user device 204, vulnerability assessment system 207, the entity server system 209, and to the external party systems 206. In this way, the hash generation system 208 can send information to and receive information from the user device 204, vulnerability assessment system 207, entity server system 209, and the external party systems 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is one or more individuals or associates associated with the entity. In this way, the user 202 may be an employee, contractor, or the like associated with the entity. Furthermore, a user 202 may be any individual having access to information or data on the entity server system 209 and/or the user 202 may be able to distribute information from the entity to a third party or external source. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the external party systems 206, the hash generation system 208, entity server system 209, and the vulnerability assessment system 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to set up marker codes and communicate with the external party systems 206.

As further illustrated in FIG. 1, the vulnerability assessment system 207 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the hash generation system 208, the external party systems 206, entity server system 209, and the user device 204. As such, the communication device 246 generally comprises a modem, server, or other device for communicating with other devices on the network 201.

As further illustrated in FIG. 1, the vulnerability assessment system 207 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the vulnerability assessment system 207 the memory device 250 stores an application 258. Furthermore, the vulnerability assessment system 207, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more hash generation system 208, vulnerability assessment system 207, entity server system 209, and/or user device 204.

In some embodiments, the user 202 may be utilizing the user device 204 to generate a communication. The communication may be a digital or electronic communication such as email, text message, or the like. The communication may further include information such as data, files, metadata, or the like associated with the user or the entity. The communication may be initiated by the user 202 with the desired receiver of the communication being an individual outside the entity and associated with an external party system 206. Upon generation of the communication, the user may attempt to send the communication with the information to the external party. The vulnerability assessment system 207 recognizes the generation of the communication and performs a vulnerability assessment of the communication to approve the communication for a permit to send. The vulnerability assessment may be an evaluation process that is built into the entity server system 209 that evaluates the security of the data in the communication prior to being transmitted.

The vulnerability assessment system 207 may run the vulnerability assessment on the communication to evaluate the security of the data. If the vulnerability assessment determines a potential problem with the information being distributed, the vulnerability assessment system 207 may transmit the communication back to the user device 204 without allowing the hash generation system 208 to generate and embed a hash within the communication. If the vulnerability assessment system 207 determine that the communication has been approved for transmission, based on the evaluation of the security of the information associated with the communication, the hash generation system 208 may then embed a hash tag within the communication that is untraceable by external party systems 206.

As illustrated in FIG. 1, the hash generation system 208 is connected to the vulnerability assessment system 207, user device 204, entity server system 209, and external party systems 206. The hash generation system 208 has the same or similar components as described above with respect to the user device 204 and vulnerability assessment system 207. The hash generation system 208 may generate the hash at the end point of the vulnerability review process for integration into information being transmitted from the entity.

A hash, as used herein may refer to a fixed-length value or key that may be embedded within the data or information on a communication being transmitted from a user to an external source. The hash may be used to recognize the approval of that communication and information therein for distribution to the external party. The hash may be a function that is used to map the data associated with the communication. In some embodiments, the hash may be a cryptographic hash function that allows for easy verification of the data within the communication. In some embodiments the domain of the hash function and the set of keys comprises a large range and will map to several different keys to identify the communication as approved or that the communication has received an approve to send status from the system.

The hash may be generated by the hash generation system 208 upon an indication from the vulnerability assessment system 207 that the vulnerability assessment for a communication being transmitted from the user device 204 to an external party associated with the external party system 206 has received the permit to send approval.

While only one hash generation system 208 is illustrated in FIG. 1, it is understood that multiple hash generation system 208 may make up the system environment 200.

As illustrated in FIG. 1, the entity server system 209 is connected to the vulnerability assessment system 207, user device 204, hash generation system 206, and external party systems 206. The entity server system 209 has the same or similar components as described above with respect to the user device 204 and vulnerability assessment system 207. The entity server system 209 may be the main system server for the entity housing the entity email, data, documents, and the like. The entity server system 209 may also include the servers and network mainframe required for the entity.

It is understood that the servers, systems, and devices described herein illustrate one embodiment of the invention. It is further understood that one or more of the servers, systems, and devices can be combined in other embodiments and still function in the same or similar way as the embodiments described herein. The hash generation system 208 may generally include a processing device communicably coupled to devices as a memory device, output devices, input devices, a network interface, a power source, one or more chips, and the like. The hash generation system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The memory device may store any of a number of applications or programs which comprise computer-executable instructions/code executed by the processing device to implement the functions of the hash generation system 208 described herein.

A hash, as used herein may refer to a fixed-length value or key that may be embedded within the data or information on a communication being transmitted from a user to an external source. The hash may be used to recognize the approval of that communication and information therein for distribution to the external party. The hash may be a function that is used to map the data associated with the communication. In some embodiments, the hash may be a cryptographic hash function that allows for easy verification of the data within the communication. In some embodiments the domain of the hash function and the set of keys comprises a large range and will map to several different keys to identify the communication as approved or that the communication has received an approve to send status from the system.

The hash may be generated by the hash generation system 208 upon an indication from the vulnerability assessment system 207 that the vulnerability assessment for a communication being transmitted from the user device 204 to an external party associated with the external party system 206 has received the permit to send approval.

In some embodiments, the hash generation system 208 and the vulnerability assessment system 207 may be associated with or incorporated within the entity server system 209.

Figure 2:
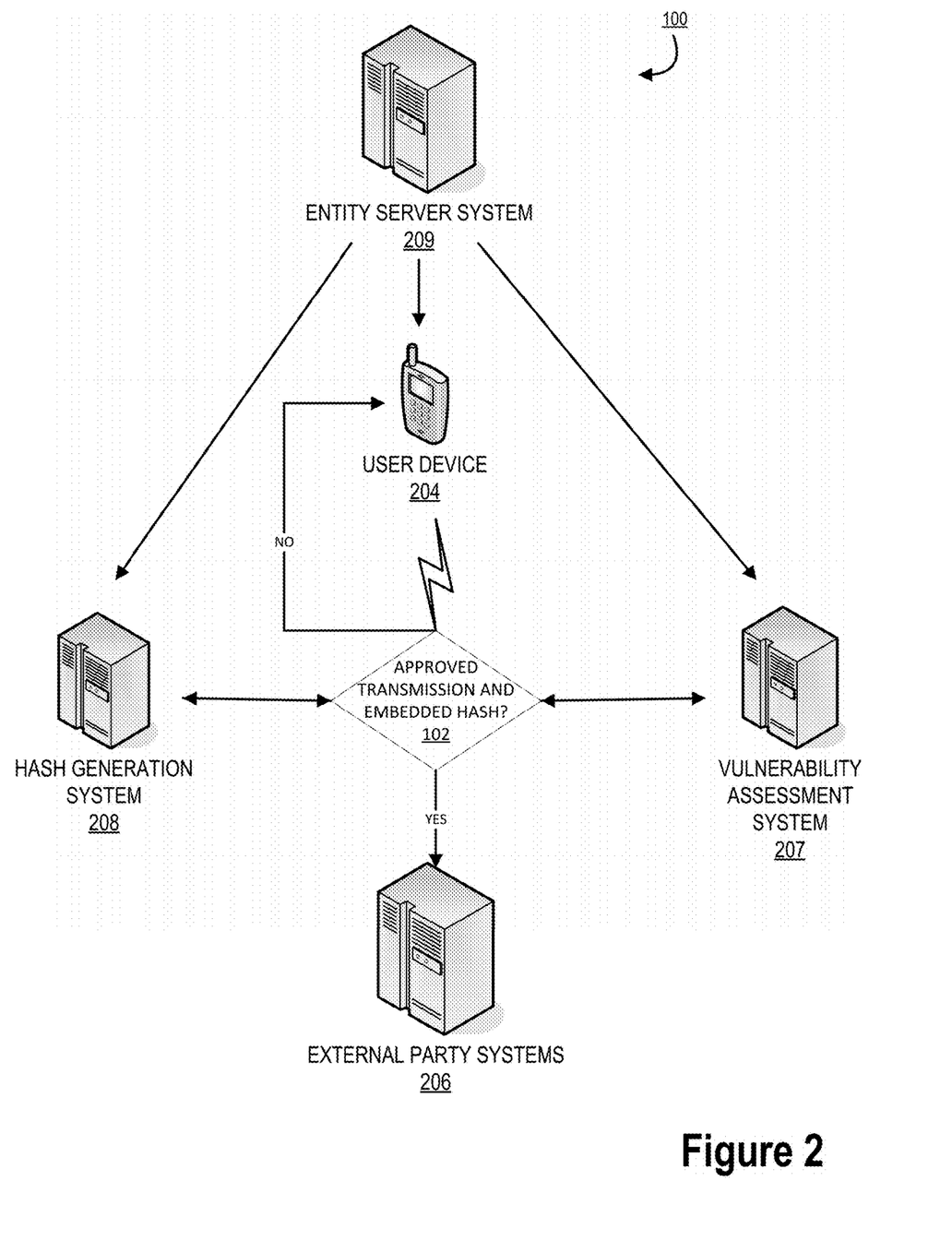
FIG. 2 illustrates a data flow within the external data deployment confirmation system environment, in accordance with embodiments of the present invention.

FIG. 2 illustrates a data flow within the external data deployment confirmation system environment 100, in accordance with embodiments of the present invention. The entity server system 209 may comprise the hash generation system 208 and the vulnerability assessment system 207. Furthermore, the entity server system 209 may also comprise all of the user devices 204 associated with users within the entity.

The user device 204 may be associated with a user. The user may be utilizing the user device 204 to generate a communication. The communication may be a digital or electronic communication such as email, text message, or the like. The communication may further include information such as data, files, metadata, or the like associated with the user or the entity. The communication may be initiated by the user with the desired receiver of the communication being an individual outside the entity and associated with an external party system 206. Upon generation of the communication, the user may attempt to send the communication with the information to the external party. The vulnerability assessment system 207 recognizes the generation of the communication and performs a vulnerability assessment of the communication to approve the communication for a permit to send. The vulnerability assessment may be an evaluation process that is built into the entity server system 209 that evaluates the security of the data in the communication prior to being transmitted. The vulnerability assessment is further illustrated in detail below with respect to FIG. 4.

As illustrated in decision block 102, the vulnerability assessment system 207 may run the vulnerability assessment on the communication to evaluate the security of the data. If the vulnerability assessment determines a potential problem with the information being distributed, the vulnerability assessment system 207 may transmit the communication back to the user device 204 without allowing the hash generation system 208 to generate and embed a hash within the communication. If the vulnerability assessment system 207 determine that the communication has been approved for transmission, based on the evaluation of the security of the information associated with the communication, the hash generation system 208 may then embed a hash tag within the communication that is untraceable by external party systems 206. The hash that is generated and embedded within the communication may be recognized by the entity server system 209 at the firewall of the entity server system 209 which allows the system to transmit the communication to the external party systems 206. In this way, the only way the communication may be transmitted outside of the entity server system 209 is if the communication has a hash embedded therein.

Figure 3:
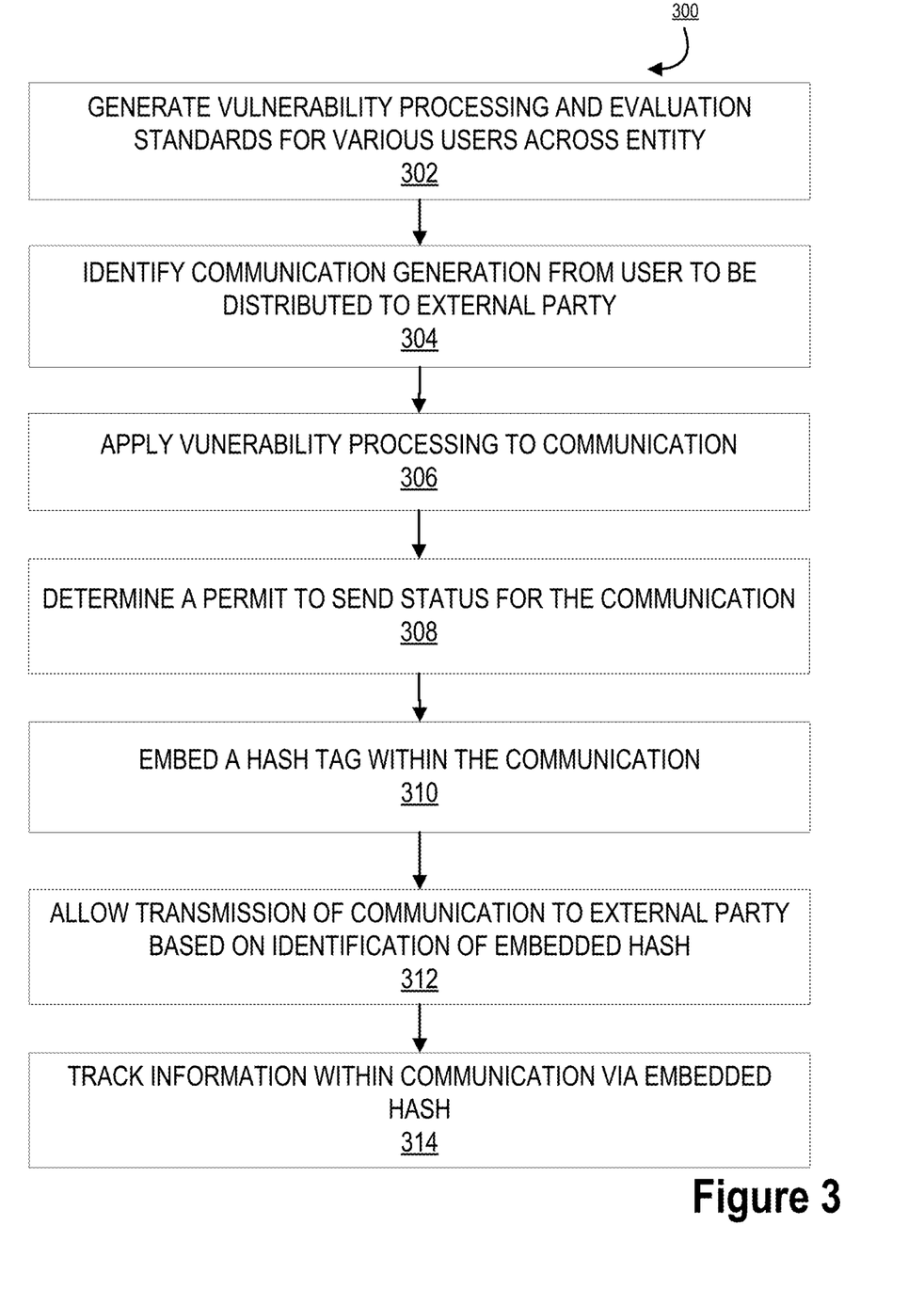
FIG. 3 illustrates a high level flowchart exterior data deployment using hash generation and confirmation, in accordance with embodiments of the present invention.

FIG. 3 illustrates a high level flowchart exterior data deployment using hash generation and confirmation 300, in accordance with embodiments of the present invention. As illustrated in block 302, the process 300 is initiated by generating a vulnerability processing and evaluation standards for various users across the entity. The vulnerability processing and the evaluation standards are further illustrated below with respect to FIG. 4.

Next, as illustrated in block 304, the process 300 continues by identifying a communication being generated from the user to be distributed to an external party. In this way, the user may generate an email, message, text, attachment, or the like. Furthermore, the communication may be the storage of data across to an external storage device for transport outside the entity server. The communication may be directed to an external party and/or have information that may have the ability to leave the entity server system. The user may finalize the communication and select to send the communication or detach the data from the entity server system. Prior to allowing the communication of the information outside the entity server system, the system may apply vulnerability processing to the communication for evaluation of security of the communication, as illustrated in block 306. The vulnerability processing and the evaluation standards are further illustrated below in FIG. 4.

As illustrated in block 308, the process 300 continues by determining a permit to send status for the communication. The permit to send status may be determined based on the vulnerability processing and the evaluation standards for security. In other embodiments, the vulnerability processing may evaluate the standards for security and determine that the communication is not permitted to send to an external party.

Next, if the vulnerability processing determines a permit to send status, the hash generation system may embed a hash tag within the communication, as illustrated in block 310. The hash may be a fixed-length value or key that may be embedded within the data or information on a communication being transmitted from a user to an external source. The hash may be used to recognize the approval of that communication and information therein for distribution to the external party. The hash may be a function that is used to map the data associated with the communication. In some embodiments, the hash may be a cryptographic hash function that allows for easy verification of the data within the communication. In some embodiments the domain of the hash function and the set of keys comprises a large range and will map to several different keys to identify the communication as approved or that the communication has received an approve to send status from the system.

The hash may be generated by the hash generation system upon an indication from the vulnerability assessment system that the vulnerability assessment for a communication being transmitted to an external party received a permit to send approval.

Once the hash has been embedded within the communication, the system may allow the transmission of the communication to an external party based on the identification of the embedded hash, as illustrated in block 312. In this way, the only way a communication may be transmitted outside of the entity firewall to an external location is if the communication has the hash embedded therein. If no hash is detected, the communication may not be allowed to pass past the entity firewall or entity server system and the communication will be maintained within the entity server system.

The permit to send and hash that is generated may have a time expiration associated therewith. In this way, the information may only be valid within the communication for distribution to an external party for a limited time. Upon triggering the expiration of the permit to send, the hash may delete itself and not allow the communication to be transmitted outside the entity.

Finally, as illustrate in block 314, the process 300 may terminate with allowing individuals to search and review communications and information within the communication by tracking the information within the communication via the embedded hash. In this way, the system may utilize the hash to track data, metadata, files, or the like that is distributed to an external source, when it was distributed to an external source, and the like. In this way, the system may be able to provide analytics as to the distribution of information and track the specific information that may have been provided to one or more external sources in case of a breach to the external source.

Figure 4:
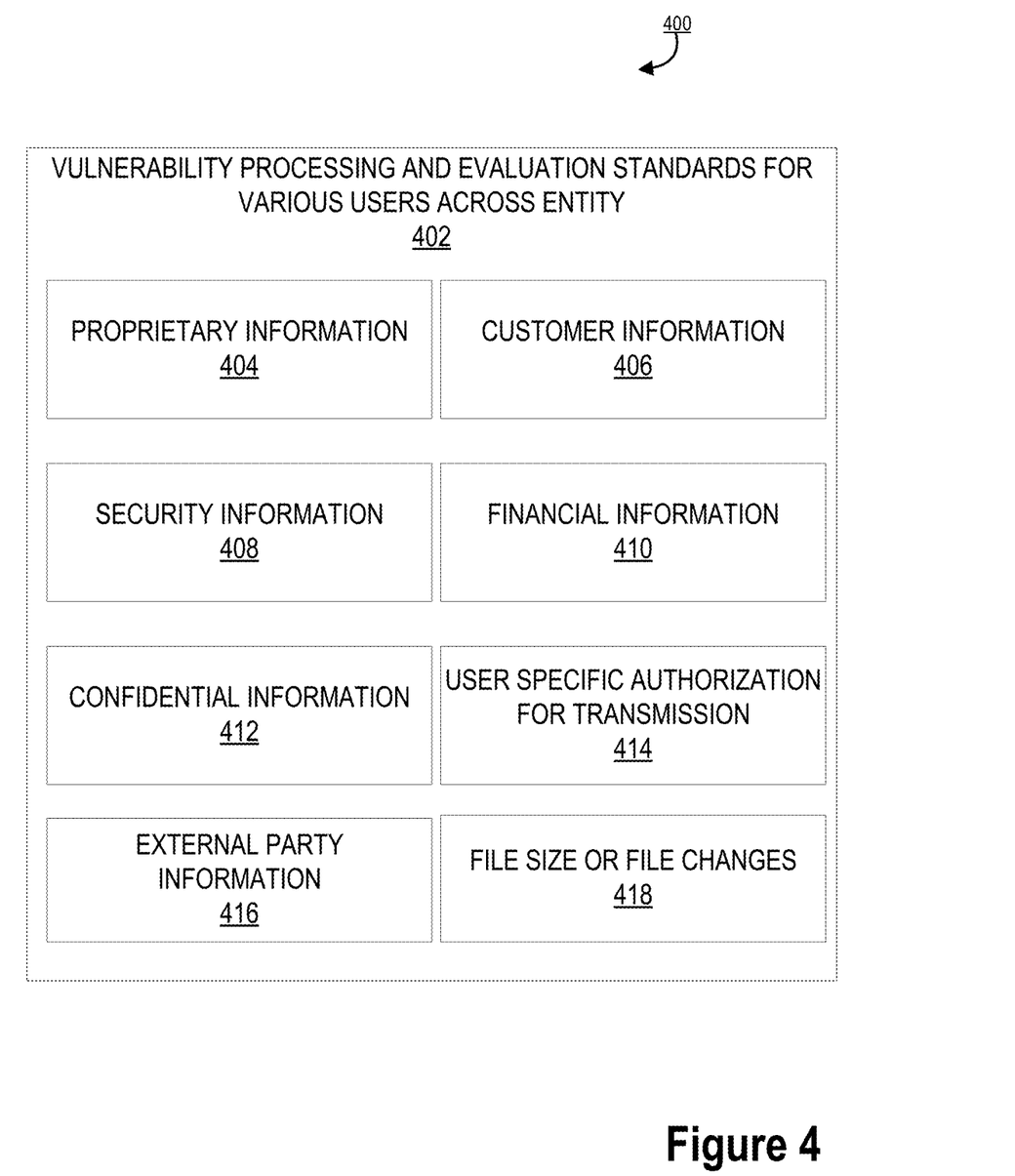
FIG. 4 illustrates a flowchart for vulnerability processing and evaluation standards, in accordance with embodiments of the present invention.

FIG. 4 illustrates a flowchart for vulnerability processing and evaluation standards 400, in accordance with embodiments of the present invention. As illustrated in block 402, the process 400 illustrates the vulnerability processing and evaluation standards for various users across the entity. The vulnerability processing reviews the communication the user is attempting to send to an external party by reviewing if the communication contains data, metadata, files, or the like that may contain one or more proprietary information 404, customer information 406, security information 408, financial information 410, confidential information 412, user specific authorization for transmission 414, file size information 418, and the identity of the external party information 416.

In some embodiments the vulnerability processing and evaluation standards may include proprietary information 404 within the communication. Proprietary information 404 may include one or more confidential documents, trade secrets, business plans, customer lists, strategies, payroll, or the like associated with the entity that may be disclosed within the body of the communication and/or within a file, data, or metadata associated with the communication.

In some embodiments the vulnerability processing and evaluation standards may include customer information 406 that may be within the communication. Customer information 406 may any information such as data, metadata, files, or the like that includes customer names and/or personal information. Personal information may include one or more of the customer's address, social security number, telephone numbers, email addresses, account information, or the like. The customer information 406 may be associated with customers of the entity that may be disclosed within the body of the communication and/or within a file, data, or metadata associated with the communication.

In some embodiments the vulnerability processing and evaluation standards may include security information 408 within the communication. The security information 408 may include passcodes, security clearance information, account information, personal identification numbers, or the like that may be associated with the entity and/or a customer that may be disclosed within the body of the communication and/or within a file, data, or metadata associated with the communication.

In some embodiments the vulnerability processing and evaluation standards may include financial information 410 within the communication. In this way, the system may review the communication to identify if any personal or private financial information 410 is within the communication. The financial information 410 may be customer financial information, entity financial information, forecasts, or the like associated with either a customer or the entity and their respective financial information 410.

In some embodiments the vulnerability processing and evaluation standards may include confidential information 412 within the communication. Confidential information 412 may be any personal information of customers, business plans of the entity, attorney-client work product, or the like. In some embodiments confidential information 412, may also be considered within the boundaries of one or more other evaluation standards such as proprietary information 404, customer information 406, security information 408, and/or financial information 410.

In some embodiments the vulnerability processing and evaluation standards may include user specific authorization for transmission 414 of the communication. In this way, the system may review the user specific authorization for transmission 414 of the communication. As such, at various levels or position requirements, the user may be approved to send more information across a communication than other users. For example, a chief financial officer or accounting manager may be approved to send any financial information 410 within their communications. In another example, managers associated with security and information technology may be allowed to send more security information 408 within communications than other users within the entity. As such, the system generates an individual user specific vulnerability processing and evaluation standard for the individual user position requirements and tasks.

In some embodiments the vulnerability processing and evaluation standards may include the identity of the external party 416 being the recipient of the communication. In this way, the system may review the historic vulnerabilities associated with the external party to determine the safety of the information being transmitted. Furthermore, the system may determine the type of business or individual the external party is and determine the information that may or may not be desired to be sent to that external party. For example, the system may determine the external party to be an attorney or a regulatory entity that requires specific vulnerability information such as financial information or the like. In another example, the external party may be a customer desiring his/her information, which would be sent via the communication to the customer.

In some embodiments, the vulnerably processing and evaluation standards may include file size information 418. In this way, the system may monitor the size or any changes in size to the files that are being distributed to the external party.

In some embodiments, the communication may contain information, files, data, metadata, or the like associated with one or more of the vulnerability processing and evaluation standards. One of ordinary skill in the art will appreciate that information may be able to be classified into one or more of the vulnerability processing and evaluation standards for review and evaluation of the communication with the information prior to distribution to the external party.

Figure 5:
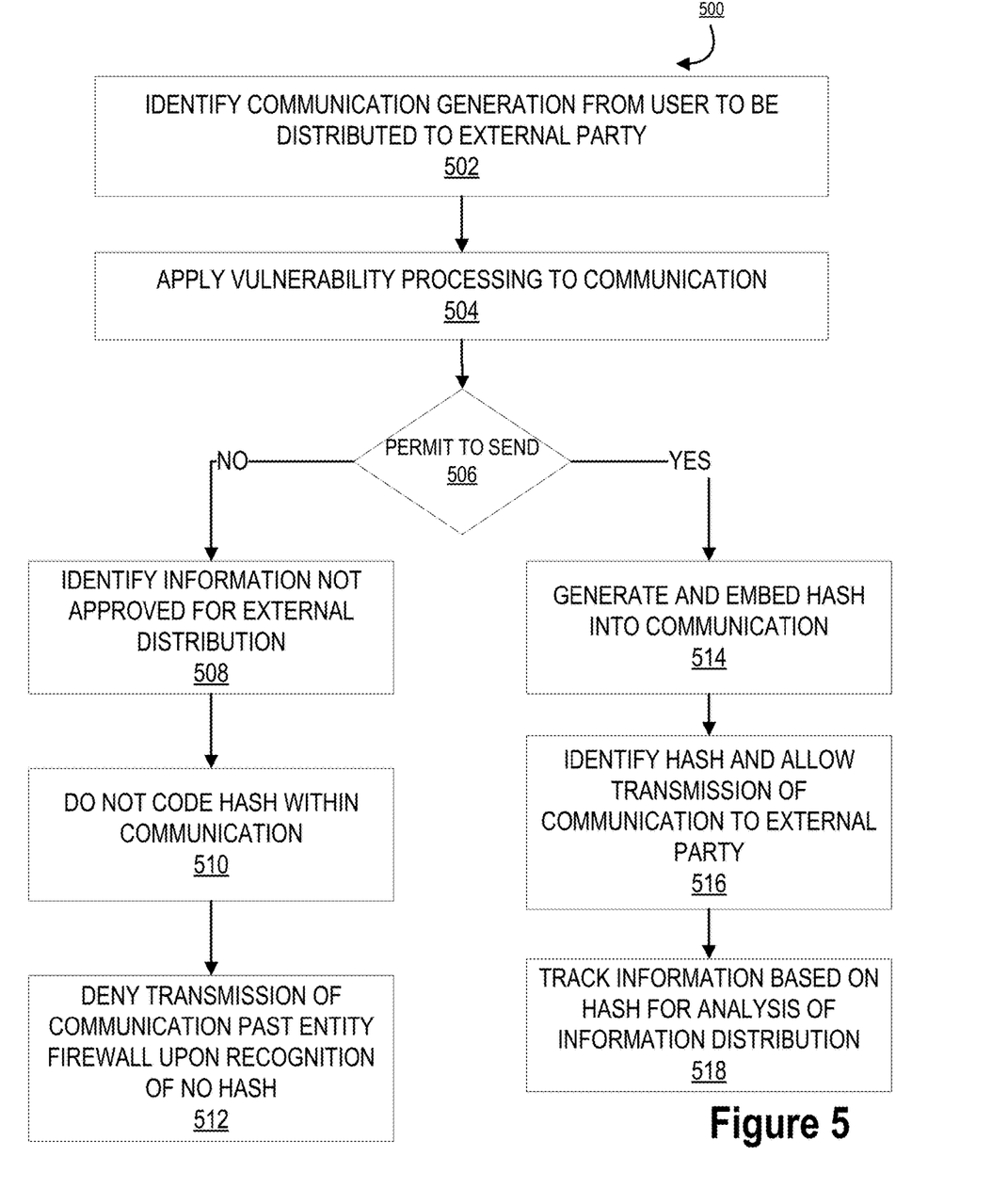
FIG. 5 illustrates a flowchart for exterior data deployment upon hash generation or hash denial, in accordance with embodiments of the present invention.

FIG. 5 illustrates a flowchart for exterior data deployment upon hash generation or hash denial 500, in accordance with embodiments of the present invention. As illustrated in block 502, the process 500 is initiated by identifying a communication being generated from the user to be distributed to an external party. In this way, the user may generate an email, message, text, attachment, or the like. Furthermore, the communication may be the storage of data across to an external storage device for transport outside the entity server. The communication may be directed to an external party and/or have information that may have the ability to leave the entity server system. The user may finalize the communication and select to send the communication or detach the data from the entity server system.

Prior to allowing the communication of the information outside the entity server system, the system may apply vulnerability processing to the communication for evaluation of security of the communication, as illustrated in block 504. The vulnerability processing reviews the communication the user is attempting to send to an external party by reviewing if the communication contains data, metadata, files, or the like that may contain one or more proprietary information, customer information, security information, financial information, confidential information, user specific authorization for transmission, and the identity of the external party information.

As illustrated in decision block 506, the process 500 continues by determining a permit to send status for the communication. The permit to send status may be determined based on the vulnerability processing and the evaluation standards for security. In some embodiments, the system determines that the communication is appropriate to send to the external party. In other embodiments, the vulnerability processing may evaluate the standards for security and determine that the communication is not permitted to send to an external party.

As illustrated in block 514, upon issuing a permit to send indicating that the system determined that the communication is appropriate to send to the external party, the system may generate and embed a hash into the communication. The hash may be a fixed-length value or key that may be embedded within the data or information on a communication being transmitted from a user to an external source. The hash may be used to recognize the approval of that communication and information therein for distribution to the external party. The hash may be a function that is used to map the data associated with the communication. In some embodiments, the hash may be a cryptographic hash function that allows for easy verification of the data within the communication. In some embodiments the domain of the hash function and the set of keys comprises a large range and will map to several different keys to identify the communication as approved or that the communication has received an approve to send status from the system. The hash may be generated by the hash generation system upon an indication from the vulnerability assessment system that the vulnerability assessment for a communication being transmitted to an external party received a permit to send approval. The permit to send and hash that is generated may have a time expiration associated therewith. In this way, the information may only be valid within the communication for distribution to an external party for a limited time. Upon triggering the expiration of the permit to send, the hash may delete itself and not allow the communication to be transmitted outside the entity.

Once the hash has been embedded within the communication, the system may allow the transmission of the communication to an external party based on the identification of the embedded hash. In this way, as illustrated in block 516, the entity system may identify the hash embedded within the communication and allow for the transmission of the communication to an external party based on the recognition of the hash being embedded within the communication. As such, the only way a communication may be transmitted outside of the entity firewall to an external location is if the communication has the hash embedded therein. If no hash is detected, the communication may not be allowed to pass past the entity firewall or entity server system and the communication will be maintained within the entity server system.

As illustrate in block 518, the system may track information based on the hash for analysis of the information that has been distributed. In this way, if an external party has been breached or misappropriated, the system may be able to identify the communications to that external party, when those communications took place, and what information was disclosed to the external party. As such, the system may utilize the hash to track data, metadata, files, or the like that is distributed to an external source. In this way, the system may be able to provide analytics as to the distribution of information and track the specific information that may have been provided to one or more external sources in case of a breach to the external source.

In some embodiments, the vulnerability processing may evaluate the standards for security and determine that the communication is not permitted to send to an external party. As illustrated in block 508, if the system determines that the communication does not receive a permit to send, the then system may identify the information not approved for external distribution. In this way, the system may identify the information within the communication that triggers a no permit to send response. This information may be highlighted within the communication and represented to the user for modification.

As illustrated in block 510, the system will not code a hash within the communication based on no permit to send being granted by the system based on the vulnerability processing. Finally, as illustrated in block 512, the entity system may deny transmission of the communication past the entity firewall upon recognition of no hash being embedded within the transmission.

Figure 6:
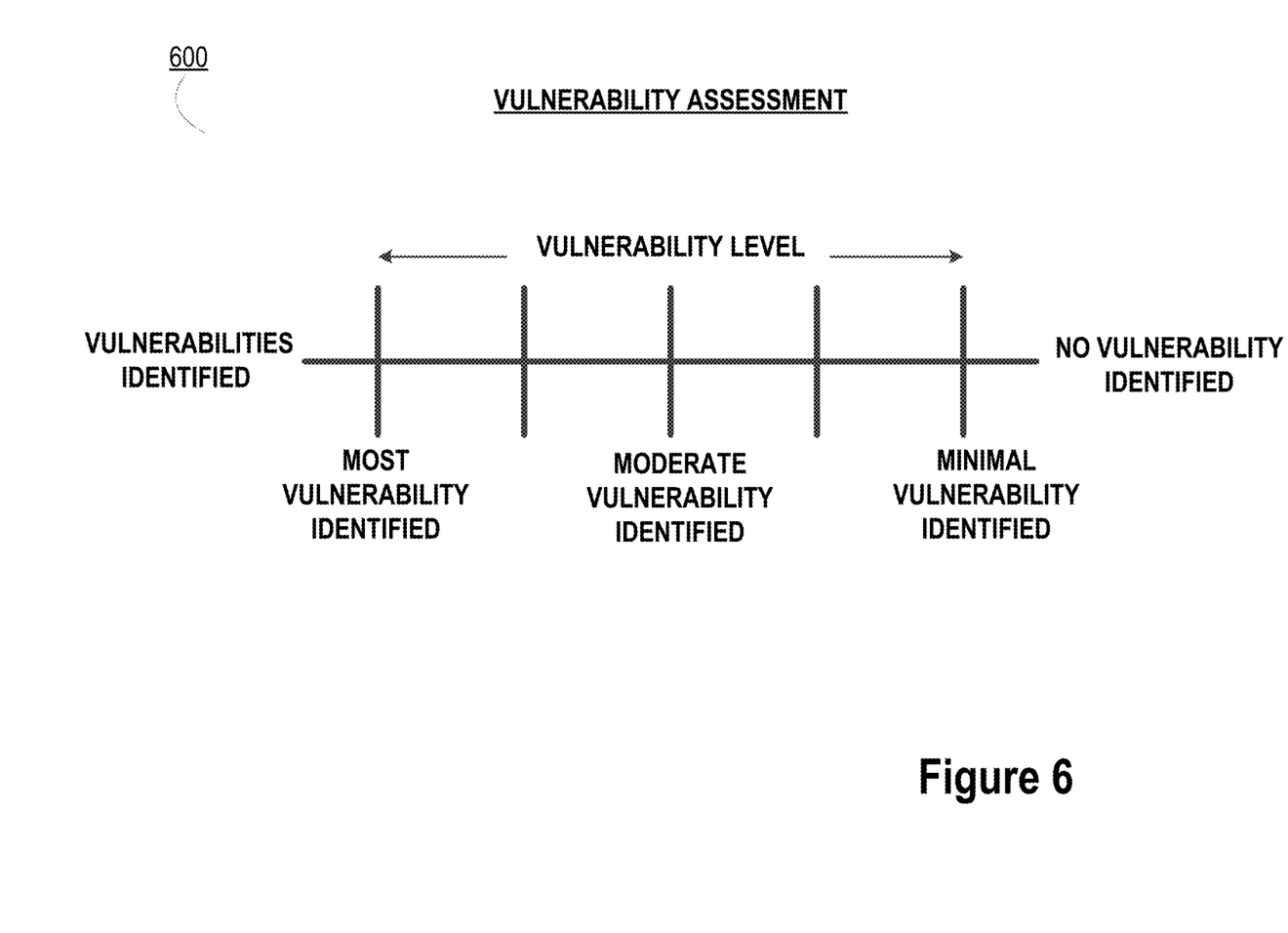
FIG. 6 illustrates a vulnerability assessment continuum for hash generation, in accordance with embodiments of the present invention.

FIG. 6 illustrates a vulnerability assessment continuum for hash generation 600, in accordance with embodiments of the present invention. On the left-hand side of the continuum, a "vulnerability identified" identifies that several vulnerabilities that may have been identified within the communication based on the vulnerability processing and evaluation. On the continuum, this point is were the most vulnerabilities are identified. On the right-hand side of the continuum, a "no vulnerability identified" indicates when no vulnerabilities to the user have been identified during the vulnerability processing and evaluation. In between the two extremes, most vulnerabilities identified equates to a low vulnerability level, moderate vulnerabilities, and minimal vulnerabilities.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authentication and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for external communication deployment, the system comprising:
    a memory device with computer-readable program code stored thereon;
    a communication device;
    a printing device for printing resource distribution documents;
    a processing device operatively coupled to the memory device and the communication device, wherein the processing device is configured to execute the computer-readable program code to:
        generate evaluation standards for individual users across an entity for external communication deployment;
        identify a communication generated by a user within the entity, wherein the communication has an external party as recipient of the communication;
        apply a vulnerability processing to the body of the communication after completion of the communication prior to communication deployment to the recipient, wherein vulnerability processing comprises reviewing the communication for proprietary information of the entity, customer information of the entity, security information of the entity, financial information of the entity or customers, and confidential information of the entity or customers for vulnerabilities to the entity;

apply the vulnerability processing to metadata of the communication to identify one or more proprietary information of the entity, customer information of the entity, security information of the entity, financial information of the entity or customers, and confidential information of the entity or customers;

generate a permit to send signal for the communication based on an approved vulnerability processing, wherein the approved vulnerability processing is based on a threshold level of identified vulnerabilities on a vulnerability continuum defined by the evaluation standards to generate a permit to send communication;

embed a hash within the permit to send communication based on receiving the permit to send signal;

not embed a hash within the communication based on a denied vulnerability processing; and allow or block, based on recognition of the hash, a communication to be transmitted outside the entity to the external party, wherein the communication is allowed to be transmitted outside the entity to the external party upon identification of the hash embedded within the permit to send communication.

2. The system of claim 1, further comprising generating a no permit to send signal based on the vulnerably processing identifying one or more vulnerabilities.

3. The system of claim 2, further comprising identifying information within the communication that triggers the no permit to send signal, wherein the information is highlighted within the communication and represented to the user for modification.

4. The system of claim 1, wherein the evaluation standards for individual users across an entity for external communication deployment are user specific evaluation standards based on the user position within the entity.

5. The system of claim 1, wherein applying the vulnerability processing to the communication after completion of the communication prior to communication deployment to the recipient further comprises calculating the evaluation standards identified within the communication or attachments and generating a level for the communication based on a position of the communication within the vulnerability continuum, wherein the position of the communication within the vulnerability continuum is based on a number of vulnerabilities identified by the calculation.

6. The system of claim 1, wherein the communication generated by the user is an electronic communication and is identified based on being generated within a network associated with the entity.

7. A computer program product for external communication deployment comprising at least one non-transitory computer-readable medium having computer-readable program code portions stored thereon, the computer-readable program code portions configured to execute the following:

generate evaluation standards for individual users across an entity for external communication deployment;

identify a communication generated by a user within the entity, wherein the communication has an external party as recipient of the communication;

apply a vulnerability processing to the communication after completion of the communication prior to communication deployment to the recipient, wherein vulnerability processing comprises reviewing the communication for one or more proprietary information of the entity, customer information of the entity, security information of the entity, financial information of the entity or customers, and confidential information of the entity or customers for vulnerabilities to the entity;

apply the vulnerability processing to metadata of the communication to identify one or more proprietary information of the entity, customer information of the entity, security information of the entity, financial information of the entity or customers, and confidential information of the entity or customers;

generate a permit to send signal for the communication based on an approved vulnerability processing, wherein the approved vulnerability processing is based on a threshold level of identified vulnerabilities on a vulnerability continuum defined by the evaluation standards to generate a permit to send communication;

embed a hash within the permit to send communication based on receiving the permit to send signal;

not embed a hash within the communication based on a denied vulnerability processing; and allow or block, based on recognition of the hash, a communication to be transmitted outside the entity to the external party, wherein the communication is allowed to be transmitted outside the entity to the external party upon identification of the hash embedded within the permit to send communication.

8. The computer program product of claim 7, further comprising an executable portion configured for generating a no permit to send signal based on the vulnerably processing identifying one or more vulnerabilities.

9. The computer program product of claim 8, further comprising an executable portion configured for identifying information within the communication that triggers the no permit to send signal, wherein the information is highlighted within the communication and represented to the user for modification.

10. The computer program product of claim 7, wherein the evaluation standards for individual users across an entity for external communication deployment are user specific evaluation standards based on the user position within the entity.

11. The computer program product of claim 7, wherein applying the vulnerability processing to the communication after completion of the communication prior to communication deployment to the recipient further comprises calculating the evaluation standards identified within the communication or attachments and generating a level for the communication based on a position of the communication within the vulnerability continuum, wherein the position of the communication within the vulnerability continuum is based on a number of vulnerabilities identified by the calculation.

12. The computer program product of claim 7, wherein the communication generated by the user is an electronic communication and is identified based on being generated within a network associated with the entity.

13. A computer-implemented method for external communication deployment, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

generating evaluation standards for individual users across an entity for external communication deployment;

identifying a communication generated by a user within the entity, wherein the communication has an external party as recipient of the communication;

applying a vulnerability processing to the communication after completion of the communication prior to communication deployment to the recipient, wherein vulnerability processing comprises reviewing the communication for one or more proprietary information of the entity, customer information of the entity, security information of the entity, financial information of the entity or customers, and confidential information of the entity or customers for vulnerabilities to the entity;

applying the vulnerability processing to metadata of the communication to identify one or more proprietary information of the entity, customer information of the entity, security information of the entity, financial information of the entity or customers, and confidential information of the entity or customers;

generating a permit to send signal for the communication based on an approved vulnerability processing, wherein the approved vulnerability processing is based on a threshold level of identified vulnerabilities on a vulnerability continuum defined by the evaluation standards to generate a permit to send communication;

embedding a hash within the permit to send communication based on receiving the permit to send signal;

not embedding a hash within the communication based on a denied vulnerability processing; and allowing or blocking, based on recognition of the hash, a communication to be transmitted outside the entity to the external party, wherein the communication is allowed to be transmitted outside the entity to the external party upon identification of the hash embedded within the permit to send communication.

14. The computer-implemented method of claim 13, further comprising generating a no permit to send signal based on the vulnerably processing identifying one or more vulnerabilities.

15. The computer-implemented method of claim 14, further comprising identifying information within the communication that triggers the no permit to send signal, wherein the information is highlighted within the communication and represented to the user for modification.

16. The computer-implemented method of claim 13, wherein the evaluation standards for individual users across an entity for external communication deployment are user specific evaluation standards based on the user position within the entity.

17. The computer-implemented method of claim 13, wherein applying the vulnerability processing to the communication after completion of the communication prior to communication deployment to the recipient further comprises calculating the evaluation standards identified within the communication or attachments and generating a level for the communication based on a position of the communication within the vulnerability continuum, wherein the position of the communication within the vulnerability continuum is based on a number of vulnerabilities identified by the calculation.

* * * * *